US012673732B2

(12) United States Patent
Bogachuk et al.

(10) Patent No.: US 12,673,732 B2
(45) Date of Patent: Jul. 7, 2026

(54) METHOD FOR PRODUCING A VEHICLE BODY

(71) Applicant: FORD GLOBAL TECHNOLOGIES, LLC, Dearborn, MI (US)

(72) Inventors: Vladimir Vladimirovich Bogachuk, West Bloomfield, MI (US); Conor Daniel Hennessey, South Hadley, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 320 days.

(21) Appl. No.: 18/599,568

(22) Filed: Mar. 8, 2024

(65) Prior Publication Data

US 2025/0282428 A1 Sep. 11, 2025

(51) Int. Cl.
*B62D 25/08* (2006.01)
*B62D 25/20* (2006.01)
*B62D 65/00* (2006.01)

(52) U.S. Cl.
CPC ......... *B62D 25/2018* (2013.01); *B62D 25/08* (2013.01); *B62D 65/00* (2013.01)

(58) Field of Classification Search
CPC ..... B62D 65/00; B23P 2700/50; B22D 31/00; B22D 31/002; B22D 17/2076; Y10T 29/49821; Y10T 29/79826
See application file for complete search history.

(56) References Cited

U.S. PATENT DOCUMENTS

| | | | |
|---|---|---|---|
| 6,193,273 B1 | 2/2001 | Novak et al. | |
| 11,192,437 B1 * | 12/2021 | Butron Luz | B60K 1/04 |
| 2002/0014008 A1 * | 2/2002 | Sato | B23K 37/047 29/33 R |
| 2007/0074840 A1 * | 4/2007 | Katsuya | B22D 17/2076 164/262 |
| 2019/0391563 A1 * | 12/2019 | Macey | B33Y 30/00 |
| 2022/0348260 A1 * | 11/2022 | Harmon | B62D 27/00 |
| 2023/0339549 A1 * | 10/2023 | Saje | B62D 27/02 |
| 2023/0356293 A1 * | 11/2023 | Wilson | B23P 6/00 |
| 2024/0123807 A1 * | 4/2024 | Hausler | B62D 21/02 |
| 2025/0282423 A1 * | 9/2025 | Hennessey | B62D 21/155 |
| 2025/0282428 A1 * | 9/2025 | Bogachuk | B62D 25/2018 |
| 2025/0376220 A1 * | 12/2025 | Aghssa | B62D 25/2027 |

FOREIGN PATENT DOCUMENTS

| | | |
|---|---|---|
| CN | 219096808 U | 5/2023 |
| DE | 102020104757 A1 | 8/2021 |
| WO | 2022031991 A1 | 2/2022 |

* cited by examiner

*Primary Examiner* — Gregory A Blankenship
(74) *Attorney, Agent, or Firm* — Vincent Mastrogiacomo; Brooks Kushman P.C.

(57) ABSTRACT

A method of manufacturing a vehicle body includes (i) casting an automotive support structure that defines a front body structure and a rear underbody structure; (ii) physically splitting the automotive support structure to detach the front body structure from the rear underbody structure; (iii) securing the front body structure to a rocker panel along a front end of the rocker panel after the splitting; and (iv) securing the rear underbody structure to the rocker panel along a rear end of the rocker panel after the splitting such that the front body structure is spaced-apart from the rear underbody structure via the rocker panel.

20 Claims, 5 Drawing Sheets

100

Casting an Automotive
Support Structure — 102

Physically Splitting the
Automotive Support Structure — 104

Secure the Front Body
Structure to One or More Additional
Vehicle Subcomponents — 106

Secure the Rear Underbody
Structure to One or More Additional
Vehicle Subcomponents — 108

METHOD FOR PRODUCING A VEHICLE BODY

TECHNICAL FIELD

The present disclosure relates to vehicle body components and methods of making vehicle body components.

BACKGROUND

Vehicles and automobiles include bodies and/or frames that operate as the underlying support structure for the other subsystems of the vehicle (e.g., powertrain systems, steering systems, etc.).

SUMMARY

A method of manufacturing a vehicle body includes (i) casting an automotive support structure; (ii) physically splitting the automotive support structure to define a front body structure and a rear underbody structure; (iii) directly securing the front body structure to one or more additional vehicle body subcomponents; and (iv) directly securing the rear underbody structure to the one or more additional vehicle body subcomponents. The front body structure, the rear underbody structure, and the one or more additional vehicle body subcomponents form the vehicle body upon securing the rear underbody structure to the one or more additional vehicle body subcomponents. At least some of the one or more additional vehicle body subcomponents are positioned between the front body structure and the rear underbody structure upon securing the rear underbody structure to the one or more additional vehicle body subcomponents. The front body structure and the rear underbody structure are spaced-apart from each other within the formed vehicle body.

A method of manufacturing a vehicle body includes (i) casting an automotive support structure that defines a front body structure and a rear underbody structure; (ii) physically splitting the automotive support structure to detach the front body structure from the rear underbody structure; (iii) securing the front body structure to a rocker panel along a front end of the rocker panel after the splitting; and (iv) securing the rear underbody structure to the rocker panel along a rear end of the rocker panel after the splitting such that the front body structure is spaced-apart from the rear underbody structure via the rocker panel.

A method of manufacturing a vehicle body includes (i) casting a front body structure and a rear underbody structure as a first integrated structure; (ii) cutting the first integrated structure to separate the front body structure from the rear underbody structure; (iii) securing the front body structure to first regions of a pair of opposing rocker rails; and (iv) securing the rear underbody structure to second regions of the pair of opposing rocker rails such that the front body structure, the rear underbody structure, and the pair of opposing rocker rails form a second integrated structure. The front body structure and the rear underbody structure are spaced-apart from each other within the second integrated structure.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
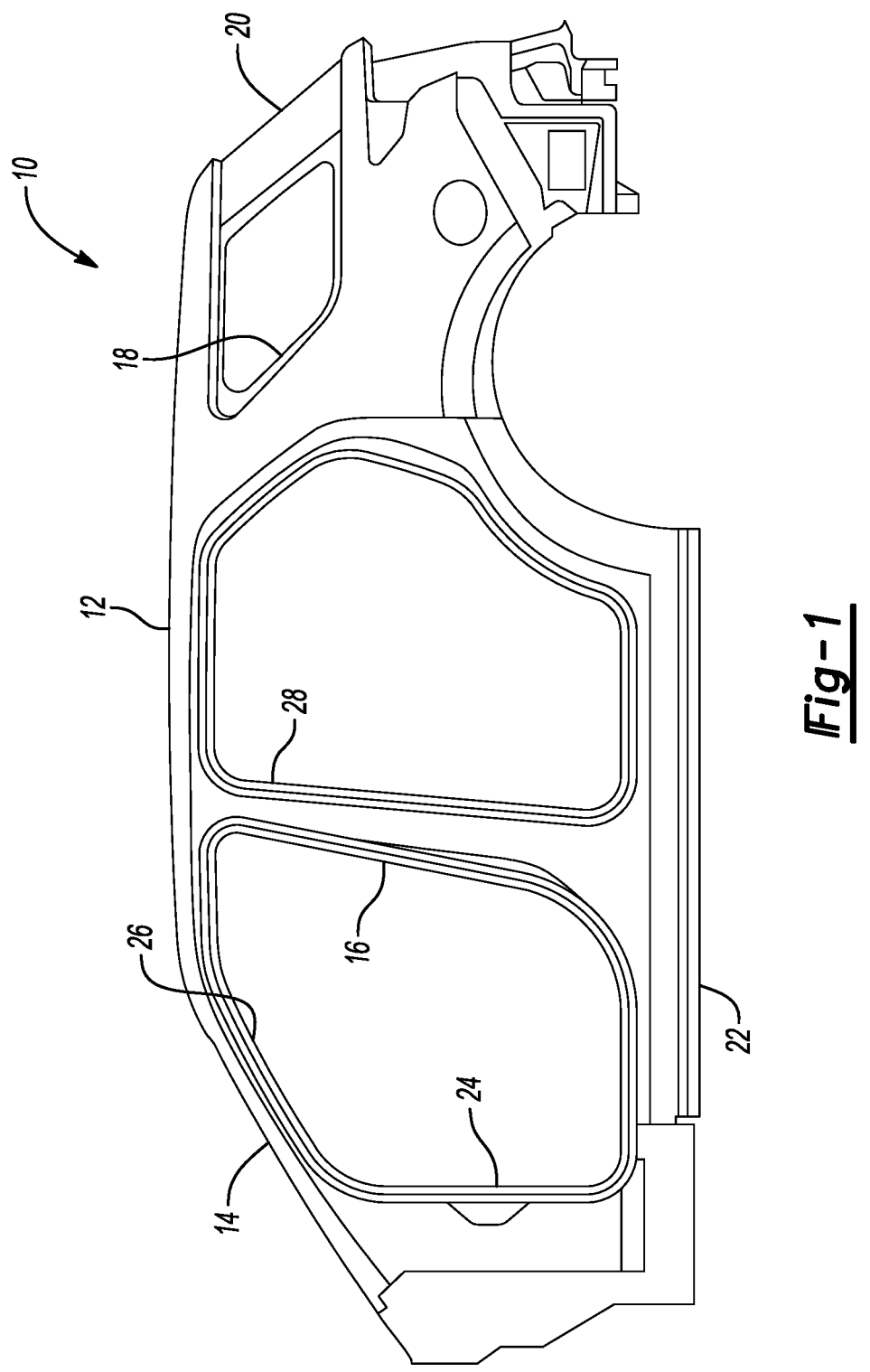
FIG. 1 is a side view of a central portion (e.g., a cabin portion) and a rear portion (e.g., a trunk portion) of a vehicle body structure.

Referring to FIG. 1 a side view of a portion of a vehicle body structure 10 is illustrated. The vehicle body structure 10 may simply be referred to as the vehicle body. The vehicle body structure 10 may include roof rails 12, A-pillars 14, B-pillars 16, C-pillars 18, D-pillars 20, rocker panels 22, A-pillar tower reinforcements 24, cross members, floor members, floor panels, or any other component or subcomponent of a vehicle body structure. The components or subcomponents of the vehicle body structure 10 may form front door frames 26 and rear door frames 28. The image in FIG. 1 is illustrative of common vehicle body components or subcomponents. The specific shape and structure of the vehicle body 10 is not intended to be limiting. Other vehicle body structure configurations should be construed as encompassed herein. For example, some vehicle body structures may not include a D-pillars 20 or may not include rear door frames 28.

The subcomponents of the vehicle body structure 10 may be secured to each other via fasteners (e.g., screws, rivets, bolts, etc.), adhesives, welding, or any other method known in the art. The subcomponents of the vehicle body structure 10 may be made from steel, aluminum, magnesium, titanium, or any other material that may operate as a support structure for the other components and subsystems of a vehicle.

Figure 2:
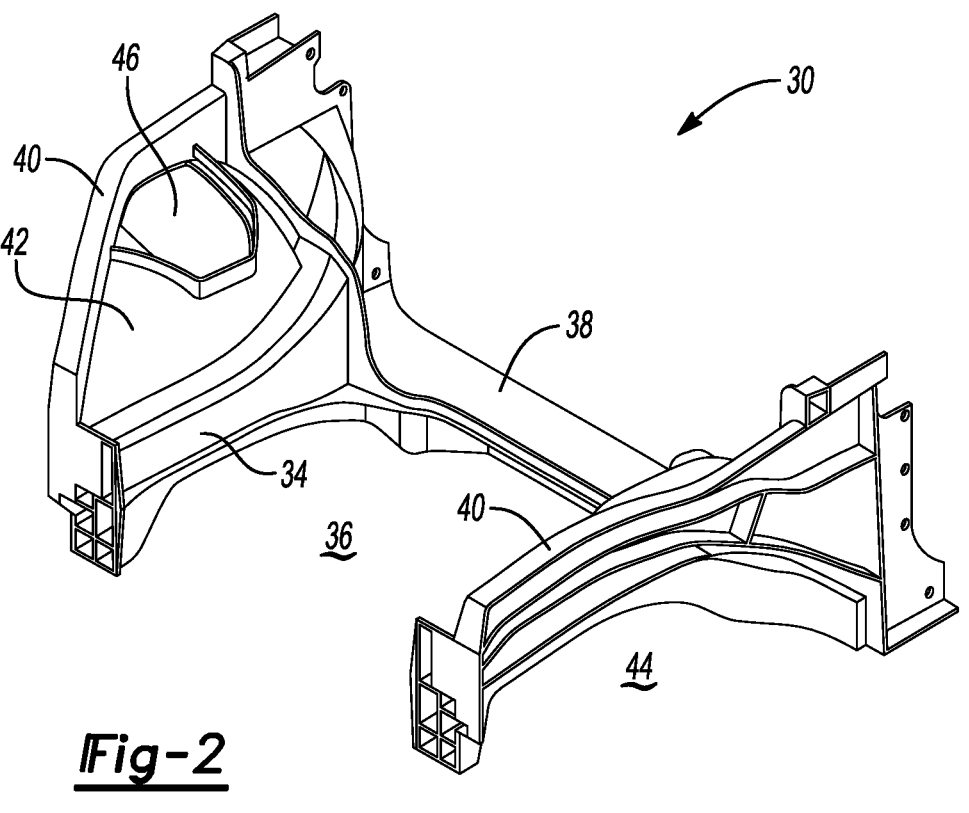
FIG. 2 is a perspective view of a front body structure, which forms a front portion of the vehicle body structure.
Figure 5:
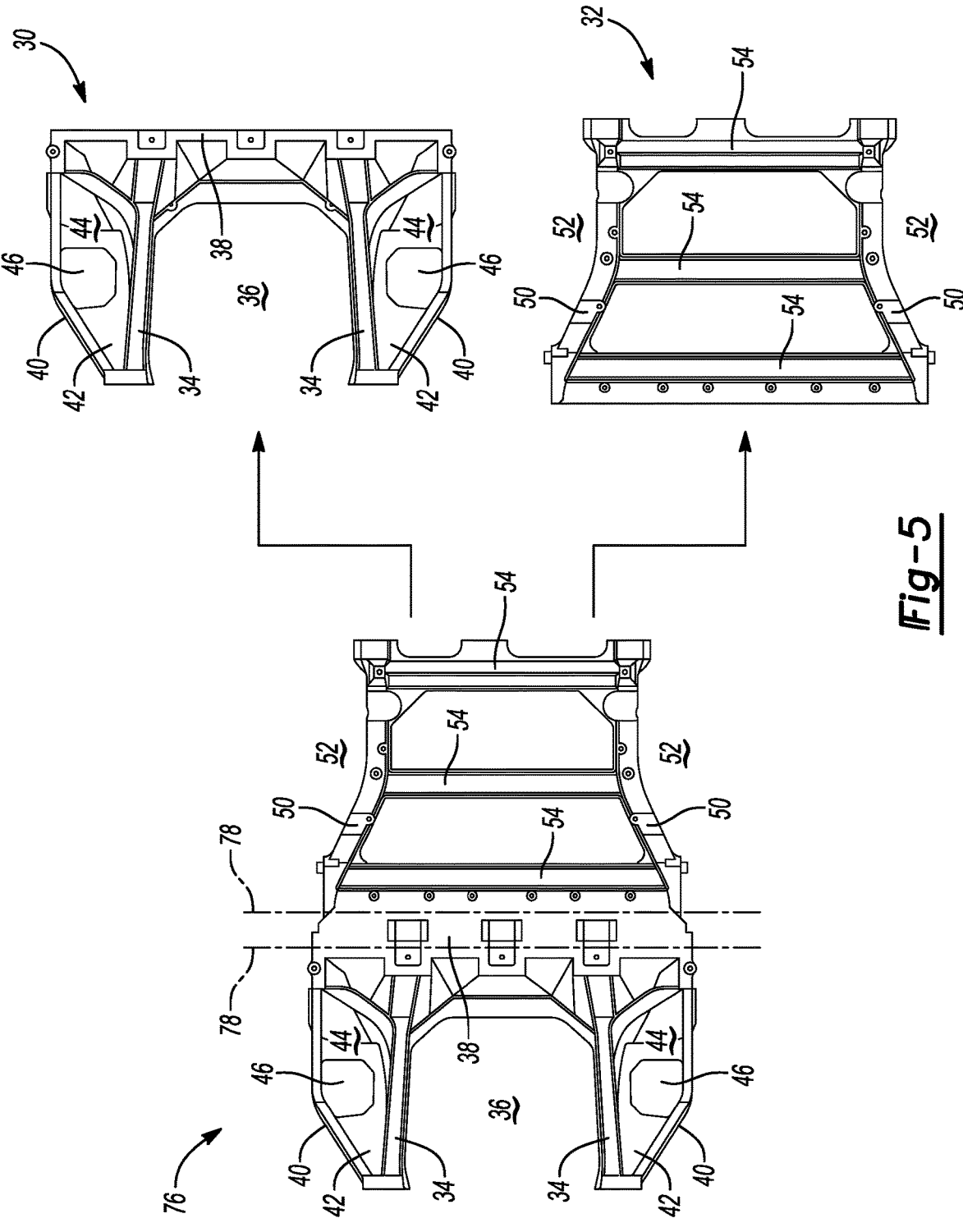
FIG. 5 is a schematic diagram illustrating a process for forming the front body structure and the rear underbody structure.

Referring to FIGS. 2 and 5 a perspective view of a front portion or a front body structure 30 of a vehicle body structure (e.g., vehicle body structure 10) and a schematic diagram illustrating a process for forming the front body structure 30 along with a rear underbody structure 32 are illustrated, respectively. The front body structure 30 and the rear underbody structure 32 are illustrated as bottom views in FIG. 5.

The front body structure 30 may include first and second opposing inner front rails 34. The first and second opposing inner front rails 34 may also be referred to as a pair of front rails 34. The inner front rails 34 partially form the front body structure 30. The inner front rails 34 define an engine compartment 36 therebetween. More specifically the inner front rails 34 may define opposing sides of the engine compartment 36. The engine compartment 36 is a space that is provided to receive an engine or other power source (e.g., electric motor) for a vehicle that includes the front body structure 30. The front body structure 30 may also include a crossmember 38 extending between the inner front rails 34. The crossmember 38 also partially forms the front body structure 30. The crossmember 38 may partially define the engine compartment 36. More specifically, the crossmember 38 may define a rear or back of the engine compartment 36.

The front body structure 30 may also include first and second outer shotgun rails 40. The first and second outer shotgun rails 40 may also be referred to as a pair of shotgun rails 40. The outer shotgun rails 40 also partially form the front body structure 30. The first outer shotgun 40 rail is disposed transversely outward from the first inner front rail 34 relative to the engine compartment 36 while the second outer shotgun rail 40 is disposed transversely outward from the second inner front rail 34 relative to the engine compartment 36.

The front body structure 30 may also include first and second wheel well panels 42 that define wheel wells 44 configured to receive the wheels of the vehicle that includes the front body structure 30. The first and second wheel well panels 42 may also be referred to as a pair of wheel well panels 42. The first wheel well panel 42 is disposed between the first inner rail 34 and the first outer shotgun 40 rail. The second wheel well panel 42 is disposed between the second inner rail 34 and the second outer shotgun 40 rail. The first and second wheel well panels 42 define first and second openings 46 configured to received shock or strut towers 48 (e.g., FIG. 4). The first opening 46 is disposed between the first inner rail 34 and the first outer shotgun 40 rail. The second opening 46 is disposed between the second inner rail 34 and the second outer shotgun 40 rail.

Figure 3:
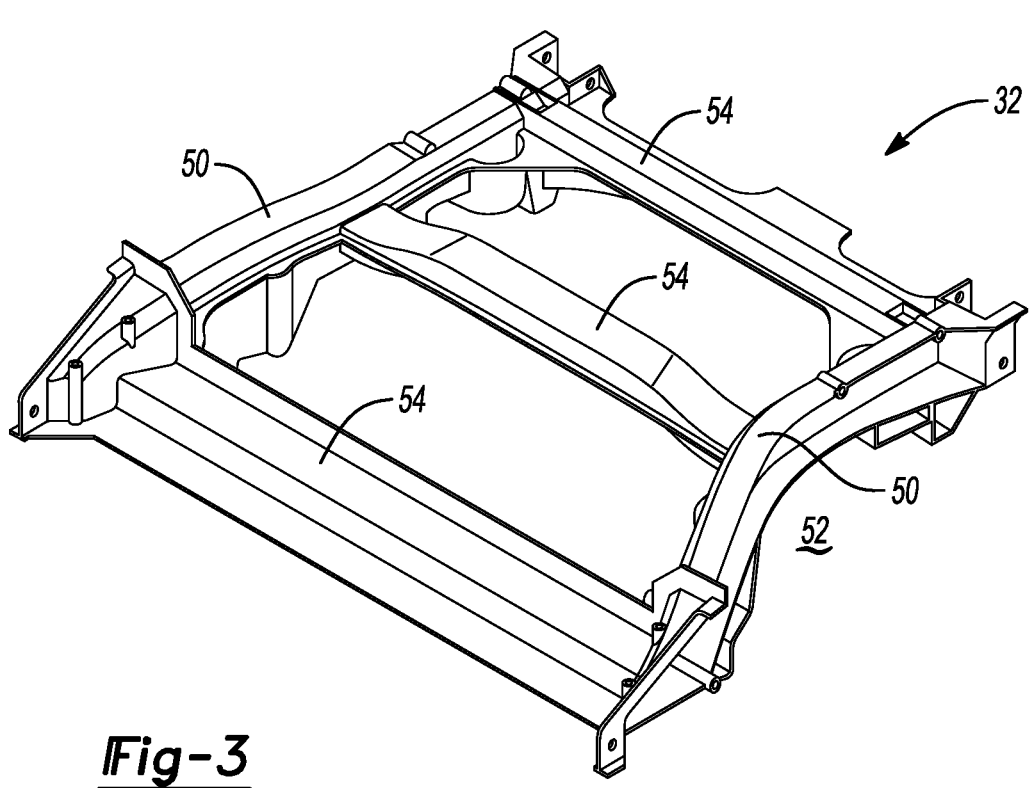
FIG. 3 is a perspective view of a rear underbody structure, which partially forms a rear portion of the vehicle body structure.

Referring to FIGS. 3 and 5 a perspective view of the rear underbody structure 32 of the vehicle body structure (e.g., vehicle body structure 10) and a schematic diagram illustrating a process for forming the front body structure 30 along with a rear underbody structure 32 are illustrated, respectively.

The rear underbody structure 32 may include first and second opposing rear side rails or rear side members 50. The first and second opposing rear side rails or rear side members 50 may also be referred to as a pair of rear side rails or rear side members 50. The first and second opposing rear side members 50 partially form the rear underbody structure 32. The first and second opposing rear side members 50 partially define first and second wheel wells 52, respectively. The rear underbody structure 32 may also include at least one crossmember 54 extending between the first and second opposing rear side members 50. The at least one crossmember 54 also partially forms the rear underbody structure 32.

Figure 4:
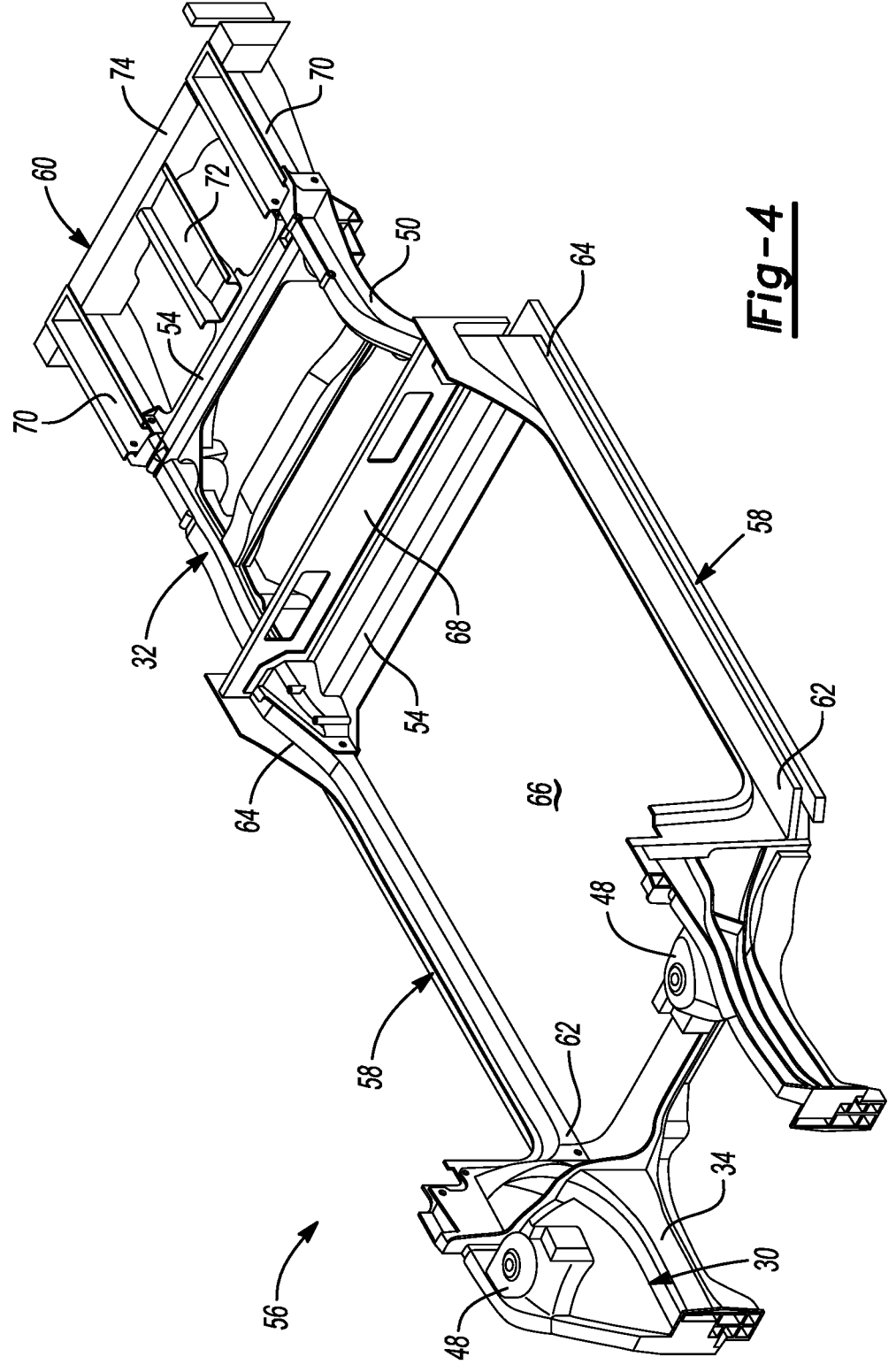
FIG. 4 is a perspective view of a lower portion or lower structure of the vehicle body that includes the front body structure and the rear underbody structure.

Referring to FIG. 4, a lower portion 56 of a vehicle body structure (e.g., vehicle body structure 10) is illustrated. The lower portion 56 of a vehicle body structure includes the front body structure 30 and the rear underbody structure 32 along with additional vehicle body subcomponents that form the vehicle body, or more specifically that form the lower portion 56 of the vehicle body. The additional vehicle body subcomponents may include first and second strut towers 48, first and second rocker rails or rocker panels 58, and a trunk support structure 60. The first and second strut towers 48 may also be referred to as a pair of strut towers 48. The first and second rocker rails or rocker panels 58 may also be referred to as a pair of rocker rails or rocker panels 58. Each of the first and second strut towers 48 may be secured to the front body structure 30. The first and second strut towers 48 may be disposed within first and second openings 46, respectively.

The front body structure 30 may be secured to the additional vehicle body subcomponents, or more specifically to the first and second rocker panels 58, along front ends 62 of the first and second rocker panels 58. More specifically, rear outward ends of the first and second inner front rails 34 may be secured to the front ends 62 of the first and second rocker panels 58. The rear underbody structure 32 may be secured to the additional vehicle body subcomponents, or more specifically to the first and second rocker panels 58, along rear ends 64 of the first and second rocker panels 58. More specifically, front ends of the first and second opposing rear side members 50 may be secured to the rear ends 64 of the first and second rocker panels 58.

A cabin space 66 may be defined between the front body structure 30, rear underbody structure 32, and the first and second rocker panels 58. A bulkhead 68 may extend between the rear ends 64 of the first and second rocker panels 58. The bulkhead 68 may be disposed over a forward crossmember of the at least one crossmember 54.

The trunk support structure 60 includes first and second rearward side rails 70, a trunk floor support 72, and a rear support member or bumper support 74. The first and second rearward side rails 70 may also be referred to as a pair of rearward side rails 70. Front ends of the first and second rearward side rails 70 may be secured to rear ends of the first and second opposing rear side members 50, respectively. The bumper support 74 may extend between and may be secured to rear ends of the first and second rearward side rails 70. The trunk floor support 72 may be disposed between the first and second rearward side rails 70. The trunk floor support 72 may extend between a rearward crossmember of the at least one crossmember 54 and the bumper support 74. The trunk floor support 72 may be secured to each of the rearward crossmember of the at least one crossmember 54 and the bumper support 74.

The subcomponents of the lower portion 56 of the vehicle body structure may be secured to each other via fasteners (e.g., screws, rivets, bolts, etc.), adhesives, welding, or any other method known in the art. The subcomponents of the lower portion 56 of the vehicle body structure may be made from steel, aluminum, magnesium, titanium, or any other material that may operate as a support structure for the other components and subsystems of a vehicle.

Referring to FIG. 5, a schematic diagram of a process for forming the front body structure 30 and the rear underbody structure 32 is illustrated. The process includes first casting an automotive support structure 76. The automotive support structure 76 is then physically split along cut lines 78, which defines or forms the front body structure 30 and the rear underbody structure 32. The front body structure 30 and the rear underbody structure 32 may also be present or defined after the casting process within the automotive support structure 76. The automotive support structure 76 may be referred to as a first unified or integrated structure that includes or encompasses the front body structure 30 and the rear underbody structure 32.

Figure 6:
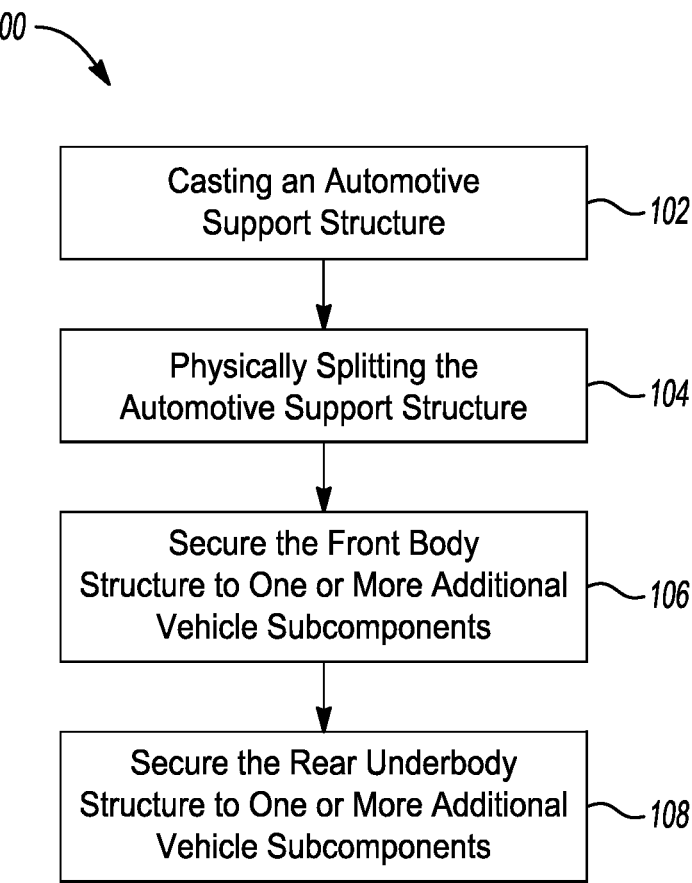
FIG. 6 is a flowchart illustrating a method for forming the vehicle body structure.

Referring to FIG. 6, a flowchart of a method 100 for forming a vehicle body structure (e.g., vehicle body structure 10), or more specifically, the lower portion 56 of a vehicle body structure is illustrated. The method 100 begins at block 102 where the automotive support structure 76 is cast. The casting process may include poring molten material into a die, followed by allowing the molten material to solidify to form the automotive support structure 76. The cast automotive support structure 76 may define the front body structure 30 and the rear underbody structure 32 at block 102. Stated in the alternative, the front body structure 30 and a rear underbody structure 32 may be cast as a first integrated structure at block 102.

Casting the automotive support structure 76 may include (i) forming the first and second opposing inner rails 34, (ii) forming the crossmember 38 extending between the first and second opposing inner rails 34, (iii) forming the first and second opposing outer shotgun rails 40, (iv) forming the first and second wheel well panels 42, (v) defining the first and second openings 46, (vi) forming the first and second opposing rear side members 50, and (vii) forming the at least one crossmember 54 extending between the first and second opposing rear side members 50.

The method 100 next moves on to block 104, where the automotive support structure 76 is physically split to define or form the front body structure 30 and the rear underbody structure 32 (e.g., the automotive support structure 76 is cut along line along cut lines 78). The front body structure 30 and the rear underbody structure 32 may be defined within the automotive support structure 76. Therefore, physically splitting the automotive support structure 76 at block 104 may include splitting or cutting the automotive support structure 76 (or the first integrated structure that includes the front body structure 30 and the rear underbody structure 32) to detach or separate the front body structure 30 and the rear underbody structure 32 from each other. The automotive support structure 76 may be physically split during a degating process where excess material is removed from the automotive support structure 76 after the casting process.

Next, the method 104 moves on to block 106, where the front body structure 30 is directly secured to one or more additional vehicle body components (e.g., any of the components illustrated in FIG. 4). More specifically, the front body structure 30 may be secured to first regions of the first and second rocker panels 58. The first regions of the first and second rocker panels 58 may correspond to the front ends 62 of the first and second rocker panels 58. The front body structure 30 may be secured to the front ends 62 of the first and second rocker panels 58 in the same manner as described and illustrated with respect to FIG. 4.

The method next moves on to block 108, where the rear underbody structure 32 is directly secured to one or more additional vehicle body components (e.g., any of the components illustrated in FIG. 4). More specifically, the rear underbody structure 32 may be secured to second regions of the first and second rocker panels 58. The second regions of the first and second rocker panels 58 may correspond to the rear ends 64 of the first and second rocker panels 58. The rear underbody structure 32 may be secured to the rear ends 64 of the first and second rocker panels 58 in the same manner as described and illustrated with respect to FIG. 4. It is noted that the chronological order of block 106 and block 108 may be changed so that block 108 occurs before block 106. It is also noted that the steps in blocks 106 and 108 may occur simultaneously.

According to the steps in blocks 106 and 108, the front body structure 30 and the rear underbody structure 32 are secured to the one or more additional vehicle body components (e.g., the first and second rocker panels 58) such that (i) the front body structure 30, the rear underbody structure 32, and the one or more additional vehicle body subcomponents form the vehicle body (e.g., vehicle body structure 10) or a portion of the vehicle body (e.g., lower portion 56 of a vehicle body structure), (ii) at least some of the one or more additional vehicle body subcomponents (e.g., the first and second rocker panels 58) are positioned between the front body structure 30 and the rear underbody structure 32, and (iii) the front body structure 30 and the rear underbody structure 32 are spaced-apart from each other within the formed vehicle body or the formed portion of the vehicle body. More specifically, the front body structure 30 and the rear underbody structure 32 may be spaced-apart from each other within the formed vehicle body or the formed portion of the vehicle body via the first and second rocker panels 58. The front body structure 30, the rear underbody structure 32, and the one or more additional vehicle body components may be referred to as a second unified or integrated structure once the front body structure 30, the rear underbody structure 32, and the one or more additional vehicle body components are secured to each other at blocks 106 and 108.

Although the steps illustrated in the blocks of FIG. 6 may generally be in chronological order, it should be understood that the flowchart in FIG. 6 is for illustrative purposes only and that the method 100 should not be construed as limited to the flowchart in FIG. 6. Some of the steps of the method 100 may be rearranged while others may be omitted entirely.

Current production includes the utilization of a front structure casting and a rear underbody casting. These castings have replaced assemblies typically comprising many individual stampings, extrusions, or small castings that are then joined in a multi-stage process. The consolidation of these parts into a single cast component eliminates the assembly process and associated expense and capital footprint for assembly tooling. Although this consolidation is an overall savings, each die casting machine may require a large investment as multiple die casting machines may be required to support production volumes.

The system disclosed herein covers a proposed manufacturing process where the front structure casting and the rear underbody casting are cast together in a single casting press. During the degating process, where the runner system is typically removed from the parts, the front and rear underbodies are separated. Combining the front and rear underbody castings into a single tool drives slightly larger press sizes relative to casting front and rear underbody castings separately. However, the investment required for a larger press is more than offset by the expense reduction that results from cutting the total number of dies in half.

It should be understood that the designations of first, second, third, fourth, etc. for any component, state, or condition described herein may be rearranged in the claims so that they are in chronological order with respect to the claims. Furthermore, it should be understood that any component, state, or condition described herein that does not have a numerical designation may be given a designation of first, second, third, fourth, etc. in the claims if one or more of the specific component, state, or condition are claimed.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A method of manufacturing a vehicle body comprising:
casting an automotive support structure;
physically splitting the automotive support structure to define a front body structure and a rear underbody structure;
directly securing the front body structure to one or more additional vehicle body subcomponents; and
directly securing the rear underbody structure to the one or more additional vehicle body subcomponents such (i) that the front body structure, the rear underbody structure, and the one or more additional vehicle body subcomponents form the vehicle body, (ii) at least some of the one or more additional vehicle body subcomponents are positioned between the front body structure and the rear underbody structure, and (iii) the front body structure and the rear underbody structure are spaced-apart from each other within the formed vehicle body.

2. The method claim 1, wherein physically splitting the automotive support structure to define the front body structure and the rear underbody structure comprises cutting the automotive support structure.

3. The method claim 1, wherein the one or more additional vehicle body subcomponents includes first and second rocker panels.

4. The method claim 3, wherein (i) the front body structure is secured to the one or more additional vehicle body subcomponents along front ends of the first and second rocker panels and (ii) the rear underbody structure is secured to the one or more additional vehicle body subcomponents along rear ends of the first and second rocker panels.

5. The method claim 1, wherein (i) casting the automotive support structure includes forming first and second opposing inner rails that partially form the front body structure and (ii) the first and second opposing inner rails define an engine compartment therebetween.

6. The method claim 5, wherein casting the automotive support structure includes forming a crossmember extending between the first and second opposing inner rails.

7. The method claim 5, wherein (i) casting the automotive support structure includes forming first and second opposing outer shotgun rails that partially form the front body structure, (ii) the first outer shotgun rail is disposed transversely outward from the first inner rail relative to the engine compartment, and the (iii) the second outer shotgun rail is disposed transversely outward from the second inner rail relative to the engine compartment.

8. The method claim 6, wherein (i) casting the automotive support structure includes defining first and second openings configured to received strut towers along the front body structure, (ii) the first opening is disposed between the first outer shotgun rail and the first inner rail, and (iii) the second opening is disposed between the second outer shotgun rail and the second inner rail.

9. The method claim 1, wherein (i) casting the automotive support structure includes forming first and second opposing rear side members that partially form the rear underbody structure and (ii) the first and second opposing rear side members partially define first and second wheel wells.

10. The method claim 9, wherein casting the automotive support structure includes forming at least one crossmember extending between the first and second opposing rear side members.

11. A method of manufacturing a vehicle body comprising:
casting an automotive support structure that defines a front body structure and a rear underbody structure;
physically splitting the automotive support structure to detach the front body structure from the rear underbody structure;
securing the front body structure to a rocker panel along a front end of the rocker panel after the splitting; and
securing the rear underbody structure to the rocker panel along a rear end of the rocker panel after the splitting such that the front body structure is spaced-apart from the rear underbody structure via the rocker panel.

12. The method claim 11, wherein physically splitting the automotive support structure to detach the front body structure from the rear underbody structure comprises cutting the automotive support structure.

13. The method claim 11, wherein (i) casting the automotive support structure includes forming first and second opposing inner rails that partially form the front body structure and (ii) the first and second opposing inner rails define an engine compartment therebetween.

14. The method claim 13, wherein casting the automotive support structure includes forming a crossmember extending between the first and second opposing inner rails.

15. The method claim 13, wherein (i) casting the automotive support structure includes forming first and second opposing outer shotgun rails that partially form the front body structure, (ii) the first outer shotgun rail is disposed transversely outward from the first inner rail relative to the engine compartment, and the (iii) the second outer shotgun rail is disposed transversely outward from the second inner rail relative to the engine compartment.

16. The method claim 15, wherein (i) casting the automotive support structure includes defining first and second openings configured to received strut towers along the front body structure, (ii) the first opening is disposed between the first outer shotgun rail and the first inner rail, and (iii) the second opening is disposed between the second outer shotgun rail and the second inner rail.

17. The method claim 11, wherein (i) casting the automotive support structure includes forming first and second opposing rear side members that partially form the rear underbody structure.

18. The method claim 17, wherein the first and second opposing rear side members partially define first and second wheel wells.

19. The method claim 17, wherein casting the automotive support structure includes forming at least one crossmember extending between the first and second opposing rear side members.

20. A method of manufacturing a vehicle body comprising:
casting a front body structure and a rear underbody structure as a first integrated structure;

cutting the first integrated structure to separate the front body structure from the rear underbody structure;

securing the front body structure to first regions of a pair of opposing rocker rails; and securing the rear underbody structure to second regions of the pair of opposing rocker rails such that the front body structure, the rear underbody structure, and the pair of opposing rocker rails form a second integrated structure, wherein the front body structure and the rear underbody structure are spaced-apart from each other within the second integrated structure.

* * * * *